Dec. 13, 1966   A. J. STOCK   3,291,981
CALIBRATING MEANS FOR RADIOACTIVE TEST APPARATUS WHICH
TESTS FLUENT MATERIAL MOVING THROUGH A CONDUIT
Filed June 26, 1963   3 Sheets-Sheet 1

INVENTOR
Arthur J. Stock

BY
Stevens, Davis, Miller & Mosher
ATTORNEYS

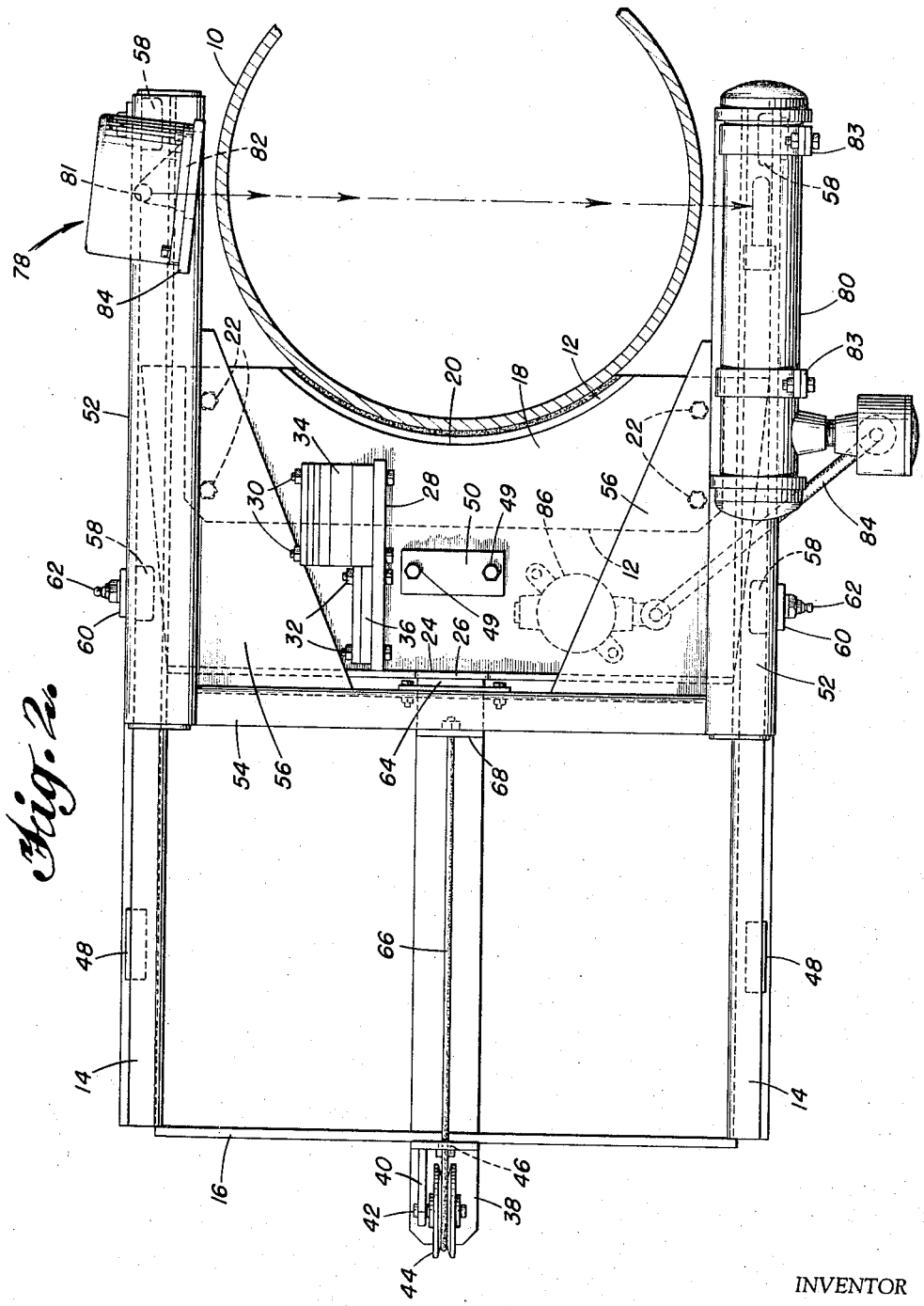

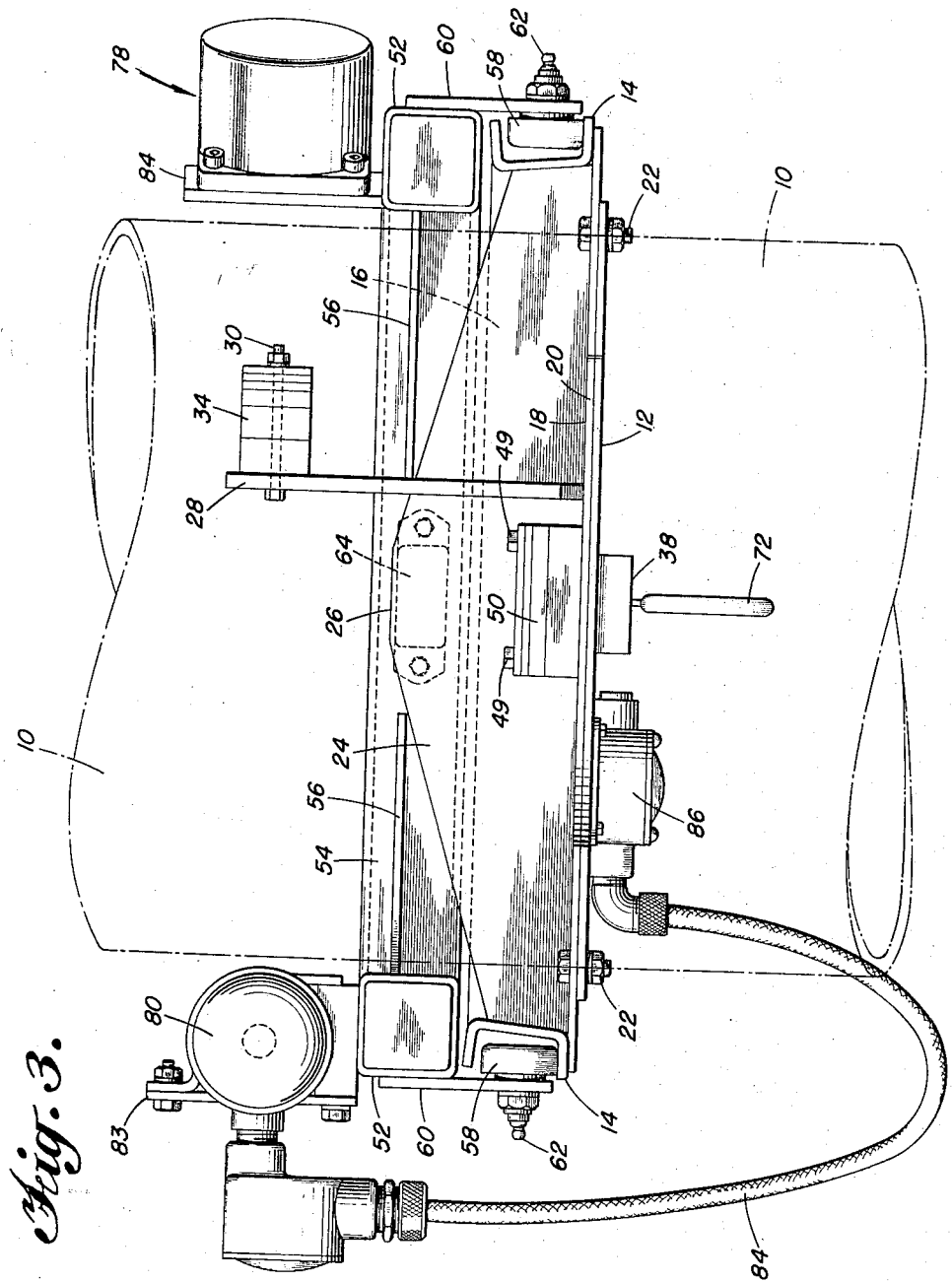

United States Patent Office 3,291,981
Patented Dec. 13, 1966

3,291,981
CALIBRATING MEANS FOR RADIOACTIVE TEST APPARATUS WHICH TESTS FLUENT MATERIAL MOVING THROUGH A CONDUIT
Arthur J. Stock, Lakewood, Ohio
(11800 Edgewater Drive, Cleveland, Ohio)
Filed June 26, 1963, Ser. No. 290,732
7 Claims. (Cl. 250—43.5)

This invention relates to a means for calibrating an apparatus used to determine the presence or properties of material in a pipe or conduit.

Many forms of test apparatus are known utilizing a variety of modes or techniques. One area of intensive development has been measuring and testing devices which operate on a radioactive principle. Such apparatus are extremely effective, particularly when used in testing a closed or inaccessible portion of a system. A principal difficulty that has been experienced with such apparatus has been the difficulty of calibrating the test apparatus or maintaining the calibration over an extended period of use. It will be appreciated that in some installations, the apparatus is subject to widely varying conditions such as temperature, humidity, and ageing, and consequently the delicate and sensitive parts of the test apparatus can be thrown off or unbalanced quite easily. Hence, repeated calibration is required.

The normal arrangement for radioactive test apparatus for determining the presence or properties of material inaccessibly enclosed in a pipe or conduit is to mount a radioactive source unit and a radiation detection unit by affixing the units directly onto diametrically opposite sides of the pipe or conduit. Therefore, calibration requires complete removal of the units, or disruption of material flow through the pipe with substitution of a standard material.

The principal object of the present invention is to provide an easy means for calibration. The source and detector units are mounted in a fixed spatial relationship, not directly on the pipe, but on a movable carriage. The carriage rolls on a rail assembly which is rigidly mounted relative to the pipe. The rail assembly may be inclined to the horizontal and provided with stops, so that the carriage has a normal resting position due to gravity, with the source and detector units on opposite sides of the pipe. Material within the pipe affects the radiation level at the detector; the test apparatus is operative. For calibration, the carriage is moved along the rail assembly up the incline, moving the source and detector units into alignment with one or more calibration blocks of preselected radiation absorption.

A further object of the present invention is to provide a calibrating means for a radioactive test assembly used on a vertical pipe at a location typically high above the floor upon which operating personnel stand.

A further object is to provide a means for calibrating test apparatus of the radioactive type used on a pipe conveying material whose flow cannot be interrupted for calibrating purposes.

Other and further objects of the present invention will become apparent from the following detailed description of a preferred embodiment of the present invention when taken in conjunction with the drawings in which:

FIG. 2 is a top view; and

FIG. 3 is a front elevation.

Figure 1:
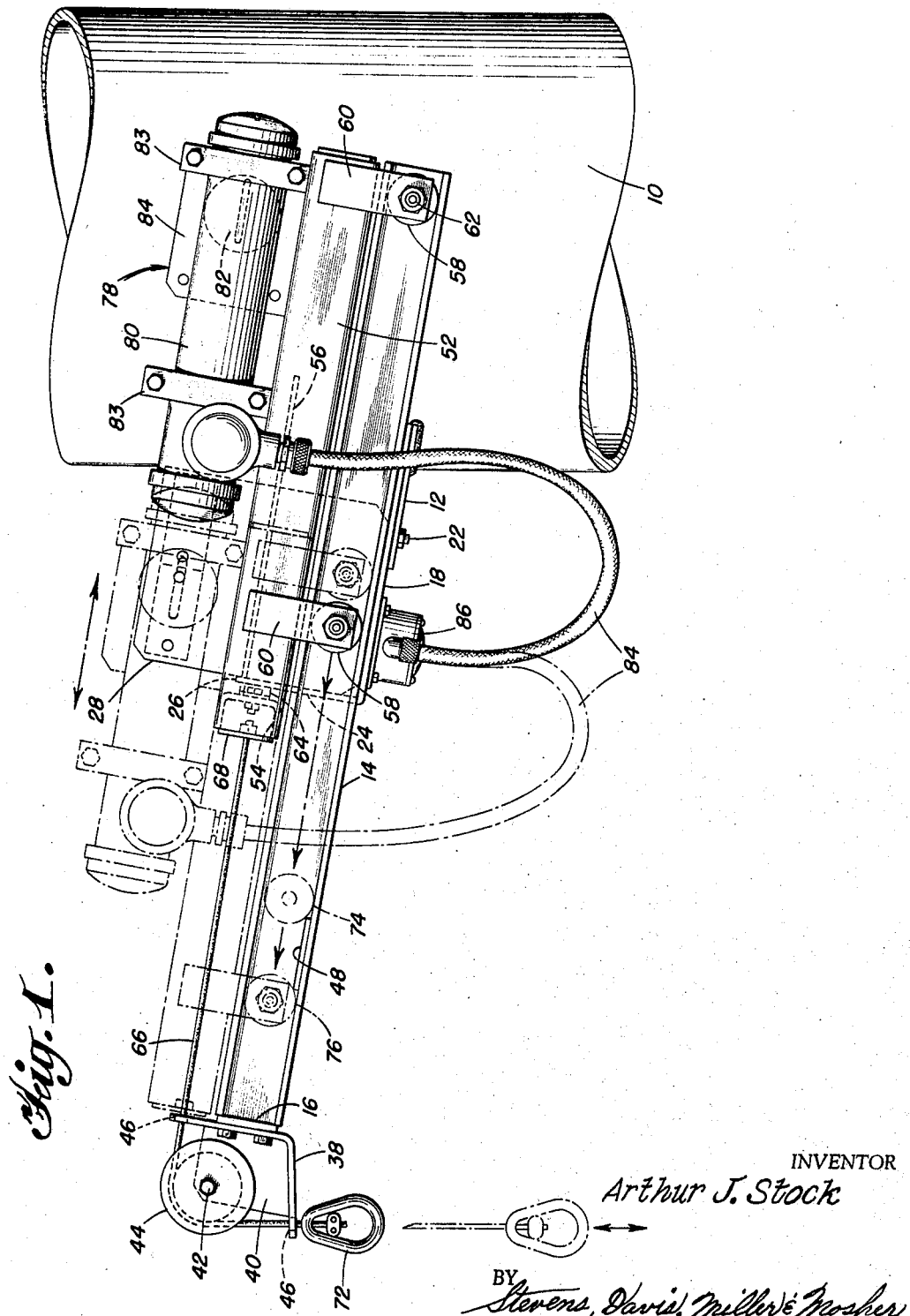
FIG. 1 is a side elevation showing a short section of the vertical conduit with the test apparatus and calibrating means mounted upon it and located in operating position, one calibrating position of the test assembly is shown in phantom.

Referring now to the drawings, a preferred embodiment of the present invention will be described as applied to a vertical downspout connecting a coal bunker above to a coal feeder below. The test apparatus comprised of a source unit and a detector unit is an alarm device specifically adapted to determine the presence or absence of coal in the downspout and to close an electrical contact in the absence of coal. The electrical contact completes an electrical circuit to activate a suitable alarm horn, light, or other controlled device.

The coal feeds by gravity from the bunker to the feeder with the system maintained dust-tight and even pressure-tight. The downspout is full of coal which is settling down slowly; as presently being described, this is not a pipe enclosing loose, free falling coal particles. The coal is ultimately fed to a furnace located lower down in the system and burned with the evolved heat being used in a boiler. The downspout is either high above the floor or not easily accessible or both. Because coal must feed continuously through the downspout to the furnace, coal flow cannot be interrupted to create a temporary void nor can a "standardized" coal be substituted, even if it were to exist, for calibration purposes.

More specifically, it should be noted that the cross-section of the downspout at the test apparatus may not be completely empty or full, but only partially so. For example, some coal may adhere to the walls of the downspout with only a "rathole" of coal being absent, or being present and flowing downwards. The sensitivity of the test apparatus is adjusted so that the electrical contact closes at some degree of emptiness at some degree of greater fullness, the contact will re-open. Calibration is the act of checking or adjusting the sensitivity setting. It is desired to be certain that the electrical contact closes at some emptiness distinctly greater than 0% and re-opens at a fullness distinctly less than 100%. In this way the test apparatus can detect with certainty an absence of coal resulting, say, from a hang-up or bridging over at the bunker outlet.

The apparatus of the present invention is mounted on a plate 12 welded to downspout 10. Plate 12 has a cut-out to fit the contour of the downspout for welding and is inclined slightly to the horizontal.

The apparatus includes a rail assembly comprised basically of a pair of side rails 14, 14, an interconnecting end plate 16, and mid-plate 18. Side rails 14 are C-section channels. The ends of side rails 14 opposite end plate 16 are free and unrestrained. Mid-plate 18 is welded to the bottom flanges of side rails 14 and interconnects them at the middle. Mid-plate 18 has a semi-circular cut-out 20 so that it does not interfere with downspout 10. The rail assembly is rigidly mounted on the downspout by bolts 22 which fasten mid-plate 18 onto plate 12. Mid-plate 18 has an upturned part 24 extending between side rails 14. This upturned part is cut off along its upper edge somewhat like a triangle, the highest point of which is designated by numeral 26. Bracket 28 is welded vertically to mid-plate 18 and to upturned part 24. Pairs of bolts 30 and 32 are provided on bracket 28 at a location substantially above rails 14 for the purpose of mounting test calibration blocks 34 and 36 of varying size and characteristics. Bolted to end plate 16 is bracket 38 which includes a vertical plate 40 on which is mounted stub shaft 42. Pulley 44 is rotatably mounted on stub shaft 42. Bracket 38 has two holes at the locations designated by 46 to guide pull cord 66. Plates 48 are welded to side rails 14 as will be further described below.

Calibration blocks 34 and 36 are each actually a grouping of several blocks of varying thicknesses, so that each can be built up to any of a variety of total thicknesses, as may be desired, by adding or removing individual blocks. Studs 49 on mid-plate 18 provide a convenient place to keep a number of spare individual blocks 50.

The carriage assembly includes a pair of legs 52, 52, each composed of a box frame, interconnected at one end by C-section channel 54. The other ends of legs 52 are free and unrestrained so that they can encompass downspout 10. Two corner plates 56 provide stiffness. A pair of wheels 58 is mounted to each leg 52 by means of plates 60. Each wheel includes a grease fitting 62. A shock absorbing bumper 64 is bolted to the inner or web section of channel 54. A pull cord 66 which may be wire, rope, or other means is attached to the carriage assembly by plate 68 welded to channel 54 and suitable fastening means 70. Pull ring 72 is attached to the other end of the pull cord by any convenient means.

When the carriage assembly is mounted on the rail assembly, wheels 58 are received in side rails 14 and ride upon the bottom flange of the C-section channels which constitute side rails 14. It will be respectfully noted in FIGURE 3 that whereas the bottom flange of the channels provides a flat surface, the rest of the channel is slightly deformed so the top flange is out of parallelism with the bottom; this provides a clearance to the wheel support plates 60. Pull cord 66 of the carriage assembly passes over pulley 44 of the rail assembly with pull ring 72 hanging freely. Since rail assembly is inclined slightly with its free ends at slightly lower elevation than its interconnected ends, the carriage assembly tends to roll down so that the free ends of the carriage assembly also are across the downspout from each other. This downward rolling is stopped and hence the normal position of the carriage assembly is defined by bumper 64 contacting high point 26 of upturned part 24 of mid-plate 18. When an operating man engages pull ring 72 with a hook and pulls down, the carriage assembly is moved up the rail assembly. When wheels 58 first strike plates 48 on side rails 14, the operator will feel a slight additional resistance to pulling. He can also feel the point at which the wheels drop off the higher end of plates 48. Thus, two additional specific positions of the carriage assembly are defined, which will be designated as calibration positions A and B respectively. The one wheel in these positions is designated in FIGURE 1 by numerals 74 and 76. The carriage assembly cannot be pulled off the rail assembly because plate 68 strikes bracket 38.

Mounted on the carriage assembly are the source unit 78 and detector unit 80. As shown in FIGURE 2, source unit 78 is basically a heavy box containing a source 81 of radioactive energy. A slit 82 in the source unit allows the radiant energy to escape in a flat, thin beam in one direction, but in other directions the material of the box absorbs the energy. As will be respectfully noted in FIGURE 2, bracket 84, which supports source unit 78 on one of the carriage assembly legs 52, is not parallel with the long axis of that leg. This is done so that the direction of maximum beam intensity is directly across the downspout which in turn permits the use of a source of minimum strength. Radioactive detector unit 80 is an elongated cylindrical tube containing the active elements and associated electronic circuitry within. Detector unit 80 is mounted on the other carriage assembly leg 52 by straps 83. Electrical leads to the detector unit including those to the output contact run through flexible cable 84 and end in connection box 86 affixed to the rail assembly; from this point electrical connections can be made as appropriate for the installation.

When the carriage assembly is permitted to return to its lowest, normal position by gravity, the source and detector unit are in line across the downspout. To calibrate the test assembly, the operator pulls the carriage up until he feels the additional resistance offered by the one wheel 58 as it reaches location 74, which is calibration position A. He then pulls the carriage farther into calibration position B and releases it to position A again. In test position A calibration blocks 34 are directly between the source and detector units; in position B blocks 36 are directly between. Blocks 34 have a radiation absorption corresponding to the downspout with the cross-section nearly full of coal; blocks 36 to the downspout nearly empty. If the operator observes that the alarm sounds in test position B but shuts off in test position A, then he is certain that the sensitivity of the detector unit is correctly set to give an alarm for no or very little coal in the pipe but to give no alarm for a full coal. In this fashion the calibration and operative condition of the test apparatus can be verified very easily and quickly.

Some alternate constructions and modifications which may have value in specific applications are the following: use of a pivoted carriage instead of rolling carriage to mount the source and detector units, use of radiant or another penetrating form of energy other than from a radioactive source, use of reflected instead of penetrating energy, use of mechanical or remotely controlled means to move the carriage into its various positions, and addition of a limit switch actuated by the motion of the carriage to disconnect the electrical contact of the detector from its usual alarm circuit and connect it instead to another suitable indicating device.

Although the present invention has been shown and described in terms of a preferred embodiment, it will be apparent that many changes and modifications will be apparent to those skilled in the art from a knowledge of the teachings contained herein. Accordingly, such changes and modifications are deemed to come within the purview of the inventive concepts disclosed and taught herein.

What is claimed is:

1. An apparatus for measuring the amount of material in a conduit comprising carriage means, a source of radiant energy and detector means mounted on said carriage means, track means, support means for supporting said track means in proximity to the conduit, first and second calibrating means mounted near said track means, said carriage means being movably mounted on said track means, said carriage means being biased toward a forward position in which the conduit is positioned between said source and detector means, retracting means connected to said carriage means for moving said carriage means rearwardly against the forward bias, indexing means mounted on said track means for contacting said carriage means when said carriage means is moving rearwardly and for imparting impedance to said rearward movement of said carriage means at a predetermined first calibrating position, and for contacting said carriage means and imparting impedance to the forward bias of said carriage means at a predetermined second calibrating position, whereby said first calibrating means is positioned between said source of radiant energy and said detector means when said carriage means is in said first calibrating position and said second calibrating means is positioned between said source of radiant energy and said detector means when said carriage means is in said second calibrating position, and indicating means connected to said detector means, for indicating the relative value of radiant energy detected by said detector means.

2. An apparatus as set forth in claim 1 wherein said track means comprises two spaced rails, said carriage means having roller means mounted on said rails, and said indexing means being mounted on said rails and positioned to contact said roller means.

3. An apparatus as set forth in claim 2 wherein said indexing means comprises a plate having forward and rear edges, said roller adapted to abut said forward edge when said carriage means is in said first calibrating position and adapted to abut said rear edge when said carriage means is in said second calibrating position, and wherein said first and second calibrating means have predetermined unequal radiation absorbing characteristics.

4. An apparatus as set forth in claim 3 wherein said plate is shaped to enable said roller means to roll over the top of said plate when said carriage means moves between said first and second calibrating positions.

5. An apparatus as set forth in claim 4 wherein said rails are inclined from the vertical enabling said carriage means to be gravity biased in the forward direction.

6. An apparatus as set forth in claim 4 wherein said retracting means comprises a cord having one end connected to the rear of said carriage means, said apparatus further comprising a pulley mounted on said support means, said cord movably engaging said pulley so that the free end of said cord extends vertically.

7. An apparatus as set forth in claim 5 wherein said indicating means comprises an alarm adapted to be energized when the radiation received by said detector exceeds a predetermined level.

References Cited by the Examiner

UNITED STATES PATENTS

| | | | |
|---|---|---|---|
| 2,748,290 | 5/1956 | Reichertz | 250—83.3 |
| 2,750,986 | 6/1956 | Russell et al. | 250—83 X |
| 2,759,108 | 8/1956 | Molins | 250—83.3 |

FOREIGN PATENTS

| | | |
|---|---|---|
| 793,301 | 4/1958 | Great Britain. |

RALPH G. NILSON, *Primary Examiner.*

ARCHIE R. BORCHELT, *Examiner.*